United States Patent [19]

Deschamps

[11] 4,187,924
[45] Feb. 12, 1980

[54] ROTARY MOWER BELT DRIVE

[75] Inventor: Joseph P. Deschamps, Naperville, Ill.

[73] Assignee: International Harvester Company, Chicago, Ill.

[21] Appl. No.: 947,685

[22] Filed: Oct. 2, 1978

[51] Int. Cl.$^2$ .................. B60K 17/28; B60K 25/06
[52] U.S. Cl. ..................... 180/53 R; 56/DIG. 22; 74/11; 74/226
[58] Field of Search .............. 180/53 R, 53 D, 53 A, 180/53 B, 53 C, 1 F; 56/DIG. 22, 15.8; 74/226, 11

[56] References Cited

U.S. PATENT DOCUMENTS

| | | |
|---|---|---|
| 3,080,696 | 3/1963 | Wood ........................ 56/DIG. 22 |
| 3,283,486 | 11/1966 | Marek ....................... 56/DIG. 22 |

OTHER PUBLICATIONS

"International 3160–Series A Mower" No. Ad–32634, International Harvester Co., 7/29/77.

Primary Examiner—John P. Silverstrim
Attorney, Agent, or Firm—Dennis K. Sullivan; Neal C. Johnson; F. David AuBuchon

[57] ABSTRACT

A right side discharge mower mounted on a tractor having a rear, clockwise-turning power take off shaft is provided with a belt drive including a drive pulley on the power take off shaft, a pair of upper idlers above the drive pulley, a pair of lower idlers below the drive pulley and an endless belt entrained about the lower side of the drive pulley and having its advance and return runs extending upwardly around the upper idlers, downwardly rearward of the drive pulley to the lower idlers, and forwardly to loop around the clockwise-turning mower input pulley.

4 Claims, 2 Drawing Figures

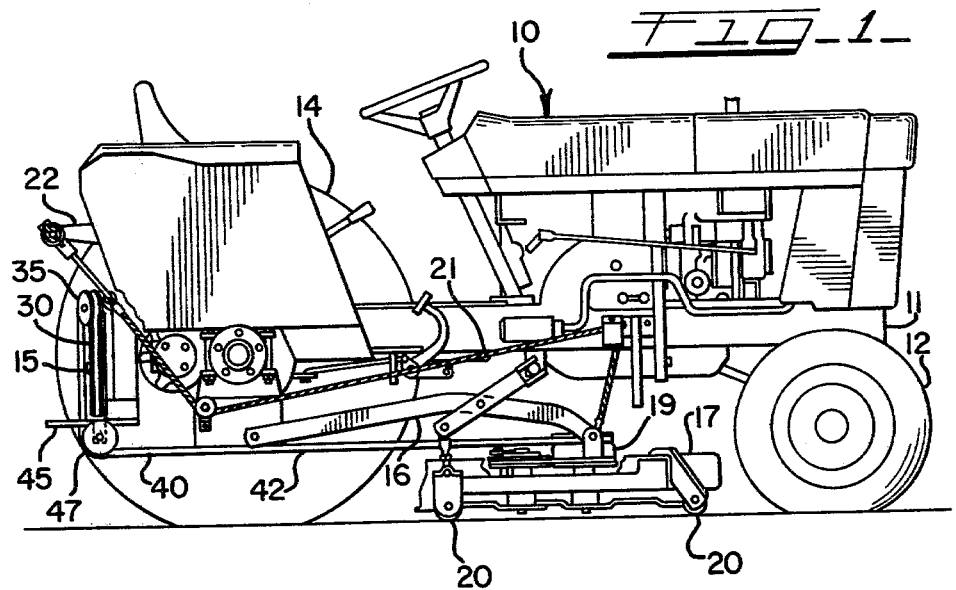
FIG_1
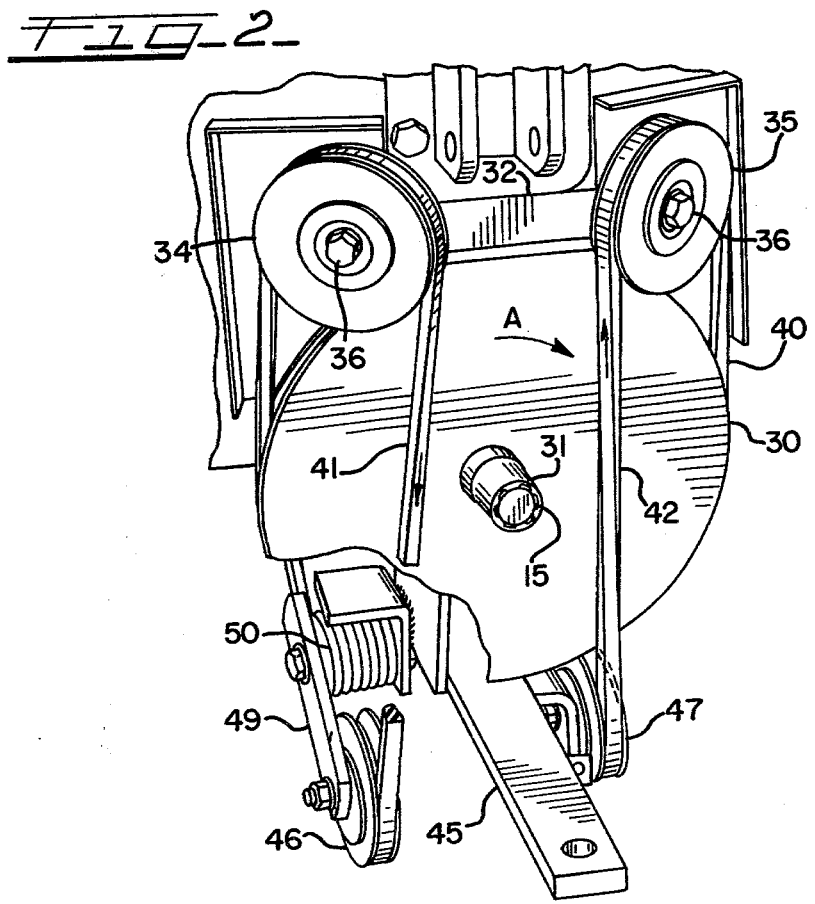
FIG_2

ROTARY MOWER BELT DRIVE

BACKGROUND OF THE INVENTION AND THE PRIOR ART

This invention relates to tractors, such as compact farm and industrial tractors and large garden tractors, having a rear power take off shaft and carrying a rotary lawn mower and, more particularly, to a belt drive apparatus for driving the mower from the power take off shaft.

Conventionally, the direction of rotation of a power take off shaft on a farm tractor is clockwise as viewed from the rear and trailing powered farm implements, such as rotary tillers, are designed to be driven by a shaft turning in this direction. On the other hand, belly mounted rotary mowers, such as the three spindle rotary mower shown in the Marek et al. U.S. Pat. No. 3,283,486, are designed to be driven clockwise as viewed from the top to produce the conventional right side discharge. A standard mule drive, such as that shown with a front power take off in the Marek patent, will not produce the desired direction of rotation with a rear power take off. If the direction of rotation of the power take off shaft were reversed, as others have done, the tractor would no longer be suitable for use with other rear mounted implements which are dependent on the direction of rotation and designed in accordance with the convention of the art.

Various arrangements have been employed to achieve correct rotation of a right side discharge mower from a standard clockwise power take-off. One arrangement employs a right angle gear box, which is generally unsatisfactory because of the additional bulk, noise, and especially cost. Other arrangements employ mule belt drives with crisscrossed belts to reverse the drive which imposes severe twisting in the belt and, in some cases, causes the belt runs to rub together resulting in short belt life. On some drives, the belt may become so severely twisted that the belt comes off the pulleys. In other belt drives, the back of the belt is bent over a pulley which further reduces belt life.

SUMMARY OF THE INVENTION

Accordingly, it is the general object of the invention described and claimed herein to provide a right side discharge mower mounted to a tractor having a clockwise-turning rear power take off shaft with a belt driving apparatus which is compact, quiet and provides maximum belt life.

The above objects, and others as may hereinafter become apparent, are specifically met in a tractor having a clockwise turning rear power take off shaft and a mower mounted to the tractor and having a clockwise rotating input pulley. The belt drive apparatus includes a drive pulley on the power take off shaft, a pair of upper idlers located above the drive pulley, a pair of lower idlers, one of which is preferably spring-loaded, below the drive pulley, and an endless belt entrained about the lower side of the drive pulley, the advance and return runs thereof extending upwardly around the upper idlers, downwardly transversely inwardly of the drive pulley diameter to the lower idlers, and forwardly to loop around the mower input pulley. The upper idlers are preferably at an angle to the drive pulley so that on one side of the upper idler, the belt aligns with the drive pulley while on the other side, the belt passes rearwardly adjacent the drive pulley thereby producing a compact structure which is more easily shielded for safety. This drive also has the advantage of providing a functional mower with a minimum of twisting of the belt between pulleys and no back bending or crisscrossing of the belt.

DESCRIPTION OF THE DRAWINGS

Other advantages of the invention will become apparent upon reading the following detailed description and upon reference to the drawings, in which:

FIG. 1 is a right side view of a tractor mower combination incorporating the invention, the right rear wheel of the tractor having been removed for clarity; and FIG. 2 is a rear pictorial view of a portion of the tractor of FIG. 1 illustrating a portion of the belt drive for the mower.

DETAILED DESCRIPTION OF THE PREFERRED EMBODIMENT

In the following description, the terms "left," "right," "forward," and "rearward," are to be taken, in accordance with the convention of the art, as viewed by one standing behind the tractor and facing it.

Turning now to FIG. 1 there is shown a compact tractor generally designated 10 of the conventional type including a frame 11 supported by front and rear wheels 12 and 14. Rearward of the rear axle, the tractor 10 is provided with a rearwardly extending power take off shaft (PTO) 15 which is driven in the conventional clockwise direction, as viewed from the rear, through suitable transmission means.

Mounted beneath the belly of the tractor by a linkage assembly 16 is a multiple-spindle rotary mower 17, of the general type illustrated in the aforementioned Marek et al. U.S. Pat. No. 3,283,486, being a conventional right hand discharge mower having a power input pulley 19 which is driven in the clockwise direction as viewed from the top. Although the mower 17 is provided with ground rollers 20 which contact high spots and reduce scalping, it will be seen that generally the linkage 16 carries the mower and maintains it in a relatively parallel attitude to the frame 11 of the tractor 10, the vertical position of the mower from the ground, being controlled by lifting cable 21 attached to the three point hitch control arm 22 at the rear of the tractor.

Turning to the apparatus for driving the mower from the PTO shaft 15 of the tractor 10, it will be seen from FIG. 2 that a large drive pulley 30 is mounted on the PTO shaft 15 by a splined hub 31, a bolt (not shown) through aligned holes in the shaft and hub preventing axial movement of the drive pulley 30 on the shaft 15. An upper idler bracket 32 is mounted to the rear of the tractor 10 above the drive pulley 30. Attached to the bracket 32 are left and right upper idler pulleys 34 and 35 which are rotatably mounted as by bearings on bolt assemblies 36 attached to the bracket 32, the axes of the upper idler pulleys 34 and 35 formed by the bolts 36 being horizontal but oriented at an acute angle to the plane of the drive pulley 30 and located so that on the transversely outer sides of the pulleys 34 and 35, their pulley grooves align with the groove of the drive pulley 30 and on their transversely inward sides, the grooves of the upper idler pulleys are rearward of the drive pulley 30. Thus, when an endless belt 40 is entrained on the drive pulley 30 in an upwardly opening loop, the advance and return runs 41 and 42 respectively will extend upwardly from the drive pulley 30 to the respective upper idler pulleys 34, 35 with only a small twist in the belt therebetween and the belt runs will pass rearwardly adjacent the drive pulley 30 as it heads downwardly.

Beneath the drive pulley 30, a bracket 45 which incorporates a fixed draw bar for convenience, is mounted to the lower side of the power take off housing of the tractor 10. Mounted on either side of the draw bar on the bracket 45 on generally transverse horizontal axes are left and right lower idler pulleys 46 and 47. The left idler 46, which is on the advance or slack run of the belt 40, is mounted on an arm 49 which is spring loaded as by torsion spring 50 to maintain tension on the belt. The axis of the right idler 47 is fixed. Thus, the advance and return runs 41 and 42 of the belt 40 extend downwardly to their respective lower idler pulleys 46 and 47 and then extend forwardly therefrom to loop around the mower input pulley 19, the belt runs making a quarter twist in the distance between the lower idler pulleys 46 and 47 and the mower input pulley 19. Thus, when the PTO shaft 15 is rotated in the clockwise direction, as shown by the arrow A on FIG. 2, the mower input pulley 19 will also be rotated clockwise and thus the mower will be driven in the correct direction.

It is noted that the vertical belt runs 41 and 42 are transversely within the diameter of the drive pulley 30. By virtue of this geometry, the belt drive connection can be accomplished without backwrapping the belt or severely twisting it as would apparently be necessary, for example, if the axes 36 of the pulleys 34 and 35 were external of the diameter of the drive pulley 30.

Thus, it can be seen that there has been provided, in accordance with the invention, a belt drive apparatus for a rotary mower which fully meets the objects, aims and advantages set forth above. It is recognized that those of skill in the art will note that certain modifications may be made based on the foregoing description. For example, rather than being belly-mounted, the mower might be mounted forwardly of the tractor. Accordingly, it is intended to cover all such modifications as come within the cope of the appended claims.

What is claimed is:

1. In a tractor having a rearwardly extending, clockwise-turning, power take off shaft and a rotary mower mounted by linkage to said tractor forwardly of said power take off shaft, said mower having a clockwise rotating input pulley for receiving power from the tractor, the improvement wherein the apparatus for driving said mower from said power take off shaft comprises a drive pulley mounted on said power take off shaft, a pair of upper idler pulleys mounted on said tractor on horizontal axes above the axis of the drive pulley respectively on each side thereof, a pair of lower idler pulleys rotatably mounted on the tractor on generally transverse horizontal axes below said drive pulley axis, and an endless belt entrained about the lower side of said drive pulley and having its advance and return runs extending upwardly respectively to loop around said upper idler pulleys, downwardly respectively from said upper idler pulleys to said lower idler pulleys, and then forwardly respectively from said lower idler pulleys to entrain about said mower input pulley.

2. The invention in accordance with claim 1 and one of said idlers on the advance belt run being spring loaded to maintain tension on said belt.

3. The invention in accordance with claim 1 and the advance and return runs of said belt between said upper idler pulleys and said lower idler pulleys being transversely inward of said drive pulley diameter.

4. The invention in accordance with claim 1 and the axes of said upper idler pulleys lying at an acute angle to the plane of the drive pulley such that on the side of said idler pulleys adjacent said drive pulley, the grooves of said drive and idler pulleys are in alignment and on the opposite sides of said upper idler pulleys the belt passes rearwardly adjacent said drive pulley to said respective lower idler pulleys.

* * * * *